United States Patent
Arelt

(10) Patent No.: US 8,226,866 B2
(45) Date of Patent: Jul. 24, 2012

(54) METHOD FOR MAKING A CONTINUOUS LAMINATE, IN PARTICULAR SUITABLE AS A SPAR CAP OR ANOTHER PART OF A WIND ENERGY TURBINE ROTOR BLADE

(75) Inventor: Rainer Arelt, Niedersachsen (DE)

(73) Assignee: General Electric Company, Schenectady, NY (US)

( * ) Notice: Subject to any disclaimer, the term of this patent is extended or adjusted under 35 U.S.C. 154(b) by 532 days.

(21) Appl. No.: 11/462,453

(22) Filed: Aug. 4, 2006

(65) Prior Publication Data

US 2007/0040294 A1 Feb. 22, 2007

(30) Foreign Application Priority Data

Aug. 17, 2005 (EP) ..................................... 05107575

(51) Int. Cl.
*B32B 38/14* (2006.01)
(52) U.S. Cl. ........ 264/136; 264/284; 264/293; 264/258; 264/310; 156/166; 156/169; 156/172
(58) Field of Classification Search .................. 264/284, 264/293, 310, 257; 156/166, 169, 172
See application file for complete search history.

(56) References Cited

U.S. PATENT DOCUMENTS

| 5,087,319 | A | * | 2/1992 | Held | 156/555 |
| 5,104,718 | A | * | 4/1992 | Asada et al. | 428/167 |
| 5,421,931 | A | * | 6/1995 | Carmien | 156/172 |
| 2003/0060109 | A1 | * | 3/2003 | Joyce et al. | 442/181 |
| 2004/0131533 | A1 | * | 7/2004 | Spacie et al. | 423/448 |
| 2006/0120874 | A1 | * | 6/2006 | Burke et al. | 416/229 R |

FOREIGN PATENT DOCUMENTS

| DE | 10014376 | | 7/2001 |
| DE | 10014376 A1 | * | 7/2001 |
| FR | 2424470 | | 11/1979 |
| JP | 03006093 | | 1/1991 |
| NL | 8104019 | | 3/1983 |

* cited by examiner

Primary Examiner — Matthew Daniels
Assistant Examiner — Jacob Thomas Minskey
(74) Attorney, Agent, or Firm — Global Patent Operation; Douglas D. Zhang

(57) ABSTRACT

The method for making a continuous laminate, in particular suitable as a spar cap or another part of a wind energy turbine rotor blade comprises the steps of providing a plurality of parallel fibers, embedding the fibers in a curable matrix material, curing the matrix material so as to obtain a fiber reinforced laminate having upper and lower major surfaces, and forming channels into at least one of the upper and lower major surfaces of the laminate wherein the channels on the upper and/or lower major surfaces are angled with respect to the direction of the fibers.

18 Claims, 4 Drawing Sheets

METHOD FOR MAKING A CONTINUOUS LAMINATE, IN PARTICULAR SUITABLE AS A SPAR CAP OR ANOTHER PART OF A WIND ENERGY TURBINE ROTOR BLADE

BACKGROUND

1. Field of the Invention

The present invention relates to a method for making a fiber reinforced endless or continuous laminate which can be used for manufacturing a spar cap or another part of a rotor blade of a wind energy turbine. Moreover, the present invention relates to the use of such a laminate for making structures such as a spar cap or another part of a rotor blade of a wind energy turbine.

2. Related Prior Art

Continuous laminates, i.e. endless flat panels of fiber-reinforced resin or other curable material are basically known. These laminates are produced in a continuous process by pulling tows of fibers (e.g. of glass or carbon) through a bath of resin and by forming the panel thus obtained. Within the laminates the fibers are arranged side by side and are aligned substantially parallel to each other. These continuous laminates can have a thickness between under 1 mm and up to several mm. The width of the laminate can be realised in substantially every dimension. The matrix material (e.g. resin) is cured in an endless process and the sheet-like laminate is wound up into coils with a length of a couple of hundreds of meters. These laminates are suitable to stack up parts or layers thereof for e.g. a spar cap of a blade of a wind energy turbine. As the fibers are substantially perfectly aligned and maintained in this alignment within the prefabricated laminates, the risk of fiber misalignment (to which especially the carbon fibers are very sensitive) upon arranging the individual layers of the laminate in the mould for manufacturing the blade is reduced.

Continuous fiber reinforced laminates as described above are sold e.g. by the Finnish company EXEL.

Using the continuous prefabricated fiber reinforced laminates for manufacturing a spar cap or another part of a wind energy turbine rotor blade involves an arrangement in which several layers of cut pieces of the laminate have to be arranged on top of each other in order to make a structure. These structures are arranged within specific areas and regions of a rotor blade mould in which also other sandwiched structures are placed. The spar cap and sandwich structure of the rotor blade provides for a rigid and shear-resistant overall structure which is light in weight and very stable. In order to manufacture the blade, an infusion process is used during which curable material (e.g. resin) is flowing into the mould in order to penetrate between the layers of the laminate as well as the structural members of the rotor blade. During the infusion process the laminate layers are pressed together due to a vacuum applied to the mould. Such infusion processes are also used for manufacturing other elements made from laminates. During these processes it might happen that the curable material flowing into the mould does not penetrate all the way through between the layers of the laminates. This results in an insufficient mechanical connection of adjacent layers of the laminates, and, accordingly, in a less rigid and stable structural element of the rotor blade or another part made from the fiber reinforced laminates by the infusion process.

SUMMARY OF THE INVENTION

The above-mentioned problem is solved by a method for making a continuous laminate, in particular suitable as a spar cap or another part of a wind energy turbine rotor blade, the method comprising the steps of providing a plurality of parallel fibers, embedding the fibers in a curable matrix material, curing the matrix material so as to obtain a fiber reinforced laminate having upper and lower major surfaces, and forming channels into at least one of the upper and lower major surfaces of the laminate wherein the channels on the upper and/or lower major surfaces are angled with respect to the direction of the fibers.

Accordingly, by way of the invention at least one surface of the continuous fiber reinforced continuous laminate is prepared so as to comprise channels for the curable material (e.g. resin) to move in between the layers of the continuous laminate arranged in a stack during an infusion process. The goal of the invention is the provision of a well-adjusted room between adjacent layers of a stack of continuous laminates even under high pressure. This is achieved by forming channels in at least one of the surfaces of the continuous laminates after primer fabrication and curing of the continuous laminate or simultaneously therewith.

In one aspect of the invention the channels are formed by grinding at least one of the major surfaces of the fiber reinforced continuous laminate by means of a grinding tool. The grinding tool is moved crosswise to the fibers of the fiber reinforced continuous laminate and to the machine direction of the fiber reinforced continuous laminate production process. This creates crosswise channels by partly grinding away material on at least one of the upper and lower major surfaces of the continuous laminate. Thereby, the fibers are cut up to the depth of the grinding cuts. The cut fibers should be subtracted from the load carrying cross sectional area of the continuous laminate. By adjusting the speed of the moving continuous laminate and the grinding tool, the angle of the channels can be adjusted relative to the main access (longitudinal direction) of the continuous laminate. Most preferably forming channels is to be applied to both major surfaces of the continuous laminate. Making the angles of the channels of the upper and lower major surfaces different from each other or just switching them from plus to minus, guaranties intersections of the channels so that the channels at the upper and lower major surfaces of the continuous laminate cannot match and close each other during stacking several layers of the continuous laminate. The roughness of the grinder or other channel forming tool should be adjusted to meet the requirements of the curable material (e.g. resin) to be moved between the layers and to minimize the flow drag of the entering curable material during the infusing process.

According to another aspect of the present invention the formation of the channels in the upper and/or lower major surface of the continuous laminate is performed while the matrix material of the continuous laminate cures. In this process, the channels preferably are not formed within the thickness areas of the continuous laminate within which the fibers are arranged. Accordingly, the continuous laminate comprises upper and/or lower thickness portions within which the channels are provided, and a middle portion arranged therebetween within which the fibers are arranged.

Further embodiments and aspects of the invention are the subject matter of the claims.

BRIEF DESCRIPTION OF THE DRAWINGS

The present invention will be described in more detail hereinbelow referring to the drawings in which.

DESCRIPTION OF PREFERRED EMBODIMENTS

Figure 1:
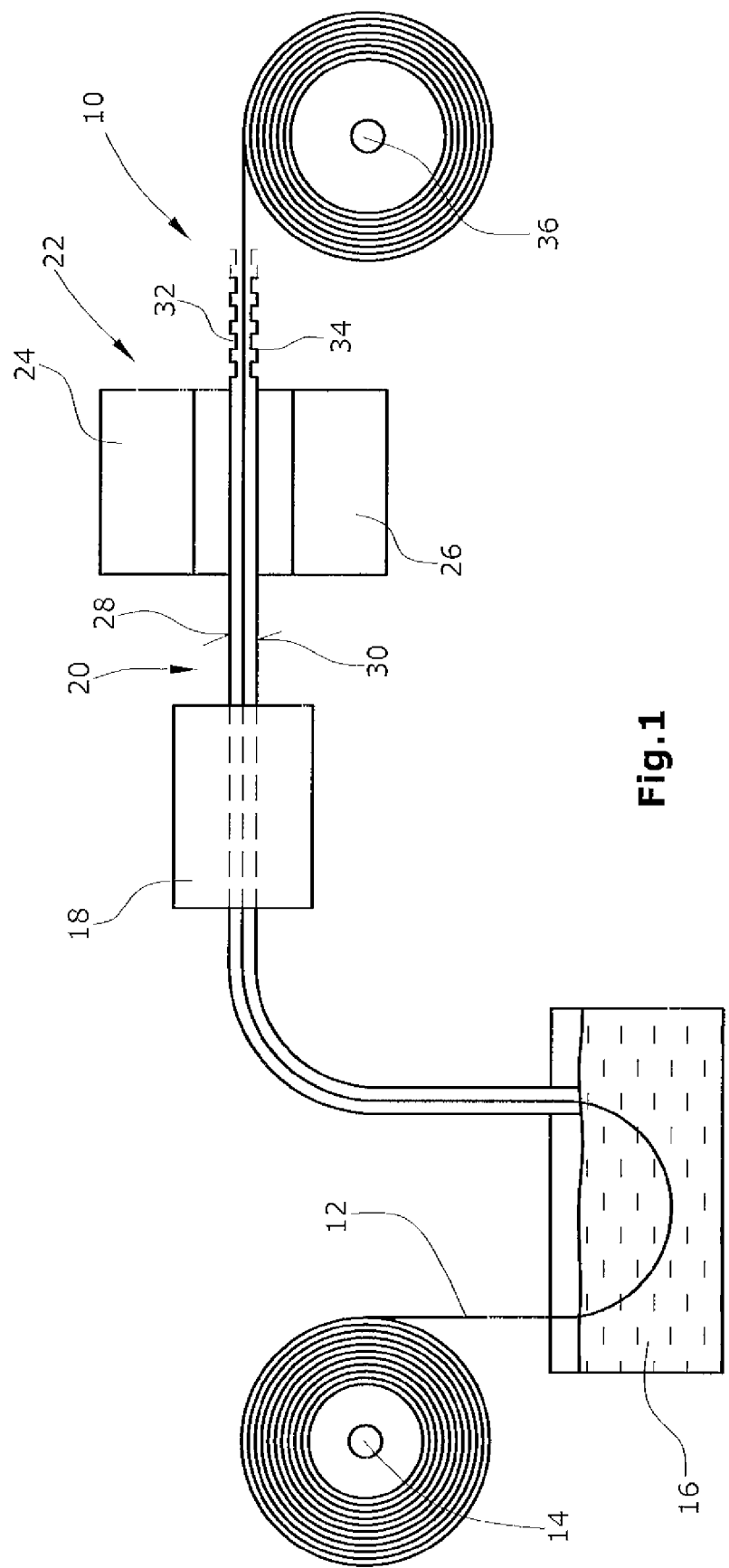
FIG. 1 shows schematically the individual process steps according to a first embodiment of a method for making a fiber reinforced continuous laminate according to the invention.

FIG. 1 shows the individual steps of a first embodiment of a method for making a fiber reinforced continuous laminate 10. A plurality of substantially parallel glass or carbon fibers 12 are drawn from a roll 14 through a bath 16 of epoxy resin. However, other curable materials in which the fibers 12 are embedded, can also be used.

The composite of fibers 12 embedded in the epoxy resin is transported to a curing station 18. Thereafter, the cured laminate 20 is further transported to a channel forming station 22 comprising two grinding tools 24,26 for grinding the upper and lower major surfaces 28,30 of the cured laminate 20. In the channel forming station 22, by means of the upper and lower grinding tools 24,26 individual channels 32,34 are formed in the upper and lower major surfaces 28,30 of the cured laminate 20 in order to make the final prefabricated continuous fiber reinforced laminate 10 which thereafter is wound up as a coil 36. From this coil 36 several individual parts of the laminates (also referred to as panels) can be cut to be stacked on each other for producing a fiber reinforced laminate.

Within the channel forming station 22, channels 32,34 are formed in the major surfaces of the cured laminate 20 by grinding. The channels on each of the major surfaces are substantially parallel to each other while the sets of substantially parallel channels 32,34 are angled with respect to each other as well as with respect to the longitudinal direction of the continuous laminate 10. Also the channels 32,34 on the two major surfaces 28,30 of the continuous laminate 10 may have different dimensions. For example the channels 34 at the lower major surface 30 can be smaller in cross section than the channels 32 and the upper major surface 28 of the continuous laminate 10.

Figure 2:
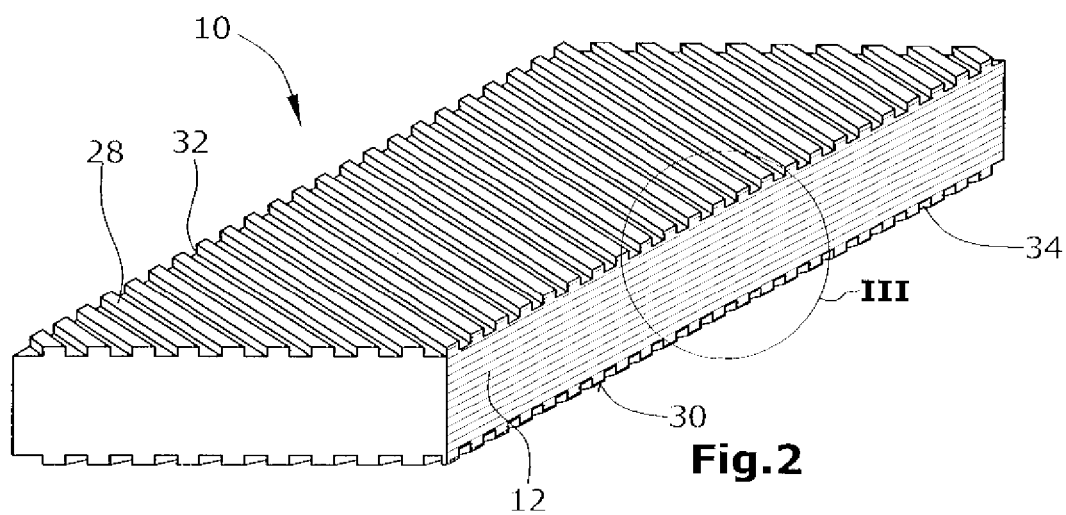
FIG. 2 shows a perspective view of a cut portion of the laminate made in accordance with the process schematically shown in FIG. 1.
Figure 3:
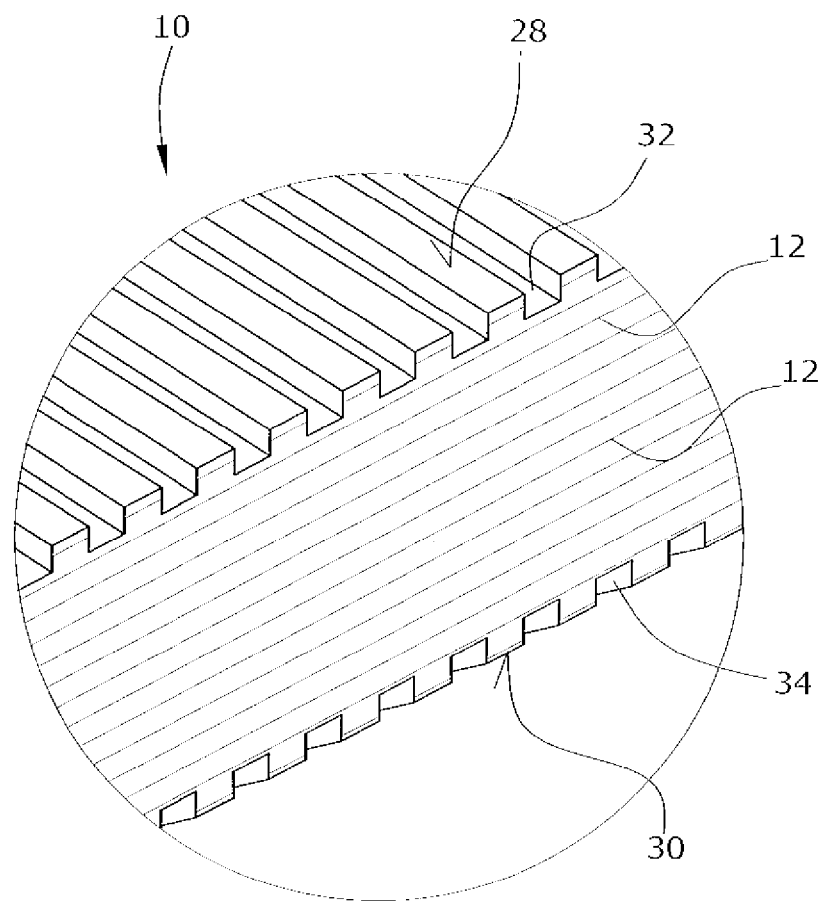
FIG. 3 shows an enlarged view of the cut portion according to the encircled area III of FIG. 2.

FIGS. 2 and 3 show a cut piece of the continuous laminate 10 depicting the layers of fibers 12 as well as the sets of the channels 32 and 34 angled with respect to each other as well as with respect to the longitudinal direction of the continuous laminate 10. Moreover, one can see that the channels 32 and 34 are cut into to the upper and lower major surfaces 28,30, with also the fibers 12 arranged in these areas of the cut laminate.

Channels 32,34 can also be formed by adding a peelply while manufacturing the continuous laminate and releasing it after curing. The fabric structure of the peelply can be chosen so as to give the desired surface condition to the continuous laminate.

Figure 4:
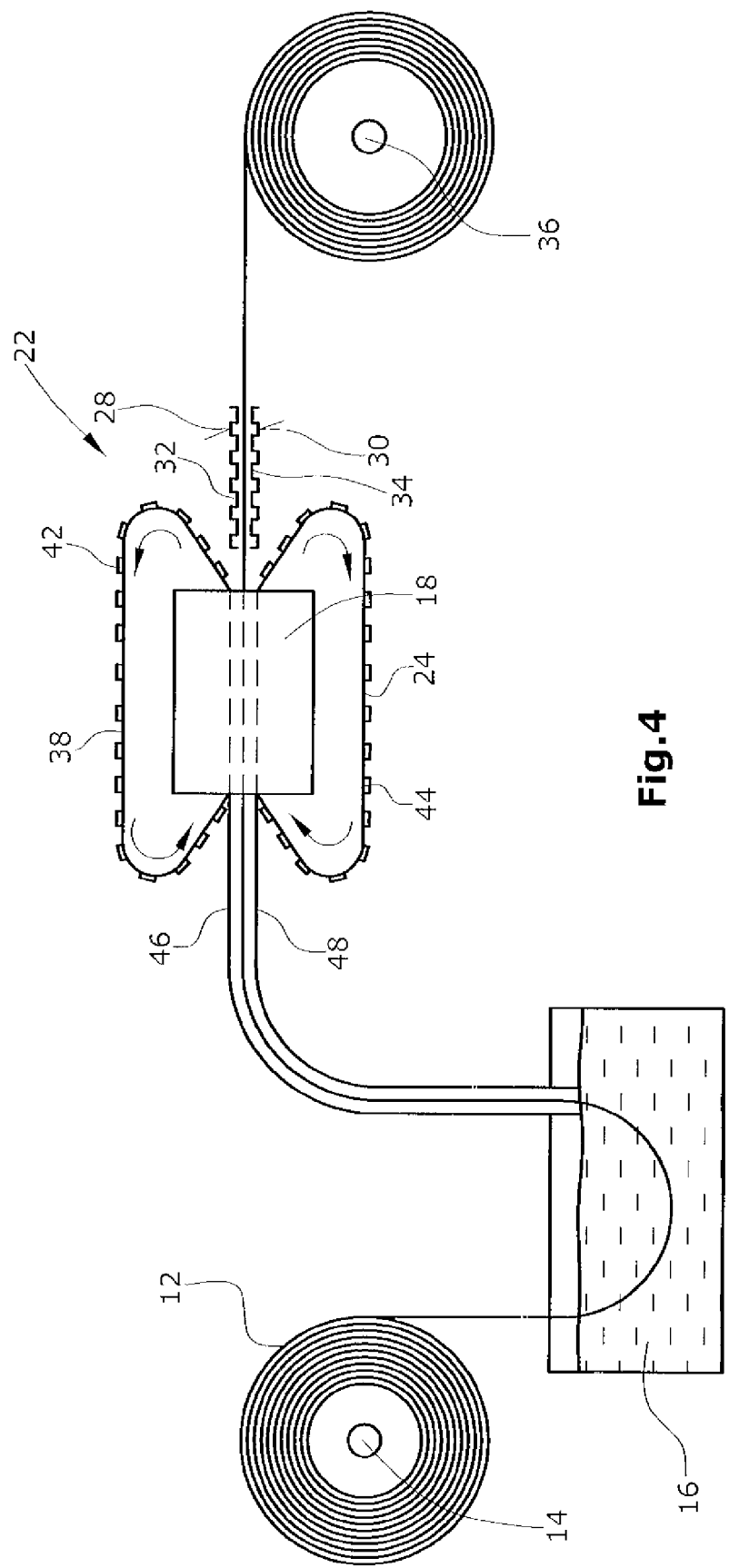
FIG. 4 shows schematically the individual process steps according to a first embodiment of a method for making a fiber reinforced continuous laminate according to a second embodiment of the present invention.

An alternative process for making the continuous laminate 10 is shown in FIG. 4. As far as the elements shown in FIG. 4 are identical or similar to the elements shown in FIGS. 1 and 2 the same reference numerals are used.

Several fibers 12 of glass or carbon are drawn from a roll 14 and set through a bath 16 of curable material (e.g. epoxy resin). Thereafter, the composite of resin with the fibers 12 embedded therein, is transported to a curing and channel forming station 18,22 for curing the composite and forming channels 32 and 34 in its upper and lower major surfaces 28,30. In this curing and channel forming station an upper and a lower chain 38,40 having individual dies 42,44 are arranged above and below the composite 10 so as to form the channels 32,34 into the upper and lower portions 46,48 of the uncured composite within which the fibers 12 are embedded. The fabricated continuous laminate 10 is again wound up as a coil 36.

Figure 5:
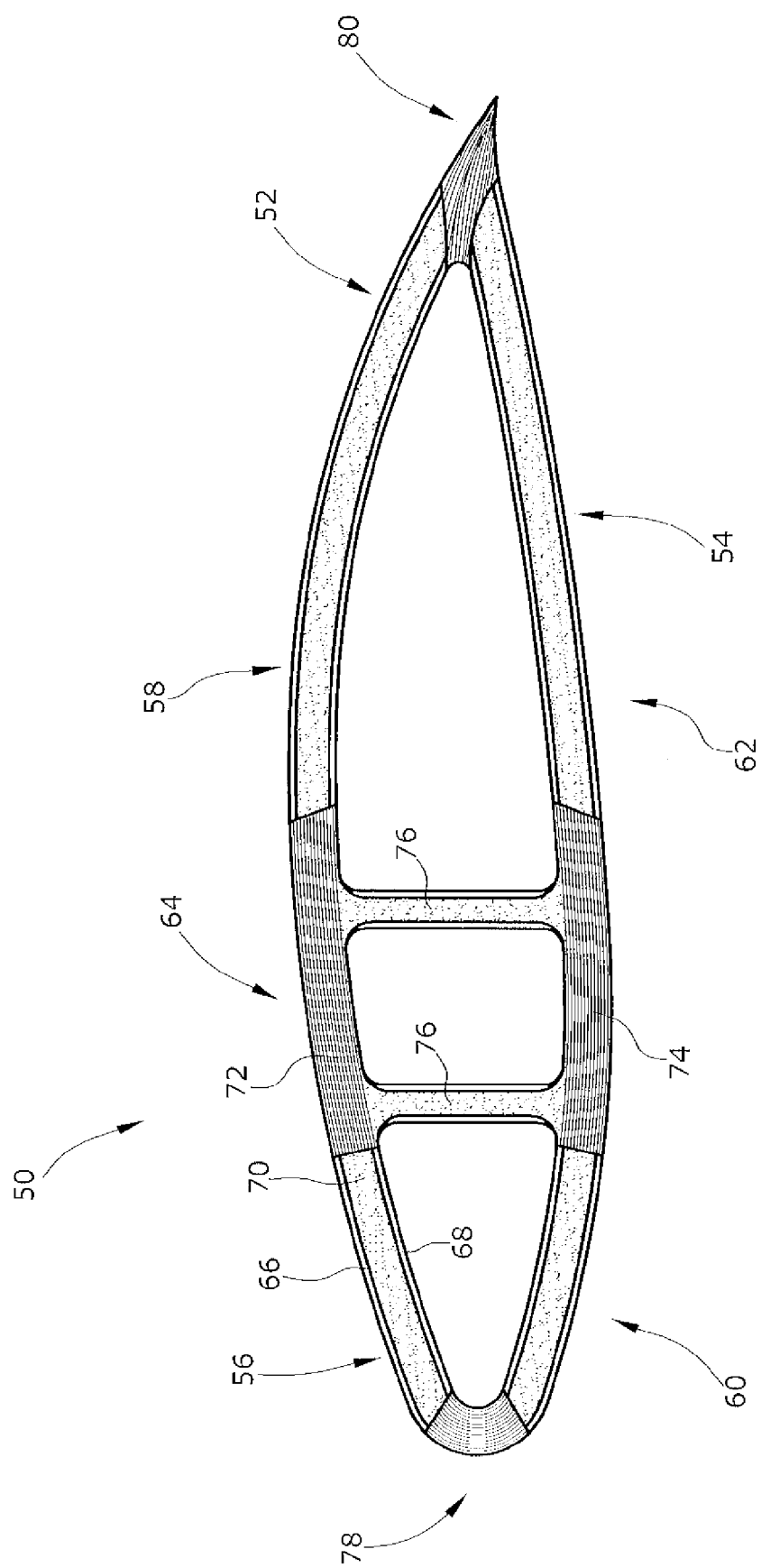
FIG. 5 shows a cross sectional view of a rotor blade comprising a spar and other parts formed by a stack of layers of the continuous laminate laminated to each other.

FIG. 5 shows a cross sectional view of a wind energy turbine blade 50 comprising an upper and a lower shell 52,54 forming the shell of the blade 50. The shell of the blade 50 is comprised of upper and lower sandwiched structures 56,58 and 60,62 between which a spar 64 is arranged. The sandwiched structrues 56,58,60,62 each comprise rigid outer skins 66,68 with a spacer 70 therebetween (merely shown for laminate 56 in FIG. 5). The outer skins 66,68 may comprise a fiber reinforced resin while the spacer 70 may comprise a sandwiched structure, a foam or light weighted material like balsa wood. Those sandwiched structures are very well known in the manufacture of rotor blades.

The spar 64 comprises an upper spar cap 72 and a lower spar cap 74 as well as two shear webs 76 therebetween. The shear webs 76 also are comprised of sandwiched structures as described earlier. The spar caps 72,74 as well as the front and rear ends 78,80 are made of a stack of portions of the laminates 10 manufactured and provided with surface channels as explained above in connection with FIGS. 1 to 3.

The overall construction of the blade 50 as shown in FIG. 5 with its individual sandwiched and laminated portions is basically known. However, according to the invention the blade 50 in FIG. 5 comprises laminated structures made of parts of the continuous laminate 10 manufactured in accordance with FIGS. 1 to 3. These laminated structures, due to the channels 32 and 34 in the layers of the laminates, provide channels in which during the infusion process for manufacturing the blade 50 resin or the like curable material can be entered and completely and homogenously distributed between adjacent layers so that an ideal connection between adjacent layers of the laminates can be generated.

Although the invention has been described and illustrated with reference to specific illustrative embodiments thereof, it is not intended that the invention be limited to those illustrative embodiments. For example, the channels on at least one of the major surfaces of the continuous layer can be curved and/or intersect each other. Also roughening the continuous laminate provides for channel-like spaces between adjacent layers of the laminates. Those skilled in the art will recognise that variations and modifications can be made without departing from the true scope of the invention as defined by the claims that follow. It is therefore intended to include within the invention all such variations and modifications as fall within the scope of the appended claims and equivalents thereof.

The invention claimed is:

1. A method for making a continuous laminate for part of a wind energy turbine rotor blade, the method comprising:
   providing a plurality of parallel fibers;
   embedding the fibers in a curable matrix material;
   curing the matrix material to form a fiber reinforced continuous laminate for the part of the rotor blade, the continuous laminate comprising opposite upper major surface and lower major surface;

forming channels into the upper major surface and forming channels into the lower major surface, wherein the channels on the upper major surface and the channels on the lower major surface extend substantially to an edge of the fiber reinforced continuous laminate and form different angles with respect to a direction of the fibers;

creating a stack of fiber reinforced continuous laminates, wherein the channels in adjacent upper and lower major surfaces of adjacent fiber reinforced continuous laminates form infusion channels; and infusing a curable material into the infusion channels, wherein the curable material is substantially homogenously distributed in the infusion channels to form the continuous laminate for part of a wind enemy turbine rotor blade.

2. The method according to claim 1 wherein the channels are cut into the upper or lower major surface of the continuous laminate after curing of the matrix material.

3. The method according to claim 2 wherein the cutting is performed using at least one grinding tool.

4. The method according to claim 3, further comprising cutting the fibers to a depth of the grinding cuts and subtracting the cut fibers from a load carrying cross-sectional area of the continuous laminate.

5. The method according to claim 1 wherein the channels are formed into the upper or lower major surface while the matrix material cures.

6. The method according to claim 5, further comprising forming the channels in upper and lower thickness portions of the continuous laminate and arranging the fibers in a middle portion therebetween.

7. The method according to claim 6, wherein the channels are formed only in the upper and lower thickness portions of the continuous laminate.

8. The method according to claim 1 wherein the fibers are selected from at least one of glass fibers and carbon fibers.

9. The method according to claim 1 wherein the matrix material is a resin.

10. The method according to claim 1 wherein the channels on the upper or lower major surface are substantially parallel to each other.

11. The method according to claim 1 wherein the channels on the upper major surface or the lower major surface form an angle with respect to the direction of the fibers.

12. The method according to claim 11, wherein the channels on the upper major surface have dimensions different from dimensions of the channels on the lower major surface.

13. The method according to claim 11, wherein the channels on the upper major surface and the channels on the lower major surfaces form different angles with respect to each other.

14. The method according to claim 1, wherein the channels on the upper major surface have dimensions different from dimensions of the channels on the lower major surface.

15. The method according to claim 1, wherein the matrix material comprises an epoxy resin.

16. The method according to claim 1, wherein the part comprises a spar cap for the rotor blade.

17. The method according to claim 16, wherein the channels in the adjacent upper and lower major surfaces do not align to close each other.

18. The method according to claim 17, wherein the curable material is substantially completely distributed within the infusion channels.

* * * * *